(12) United States Patent
Yamagiwa

(10) Patent No.: US 6,871,888 B2
(45) Date of Patent: *Mar. 29, 2005

(54) SHOCK ABSORBER FOR A TWO-WHEELED VEHICLE

(75) Inventor: Toshio Yamagiwa, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/623,652

(22) Filed: Jul. 22, 2003

(65) Prior Publication Data

US 2004/0124642 A1 Jul. 1, 2004

Related U.S. Application Data

(63) Continuation of application No. 10/207,987, filed on Jul. 31, 2002, now Pat. No. 6,637,786.

(30) Foreign Application Priority Data

Aug. 7, 2001 (JP) ........................................ 2001-239973

(51) Int. Cl.⁷ ............................ B60R 19/04; B62J 27/00
(52) U.S. Cl. .................. 293/102; 293/105; 296/187.09; 188/377
(58) Field of Search ................................. 293/102, 105, 293/120, 133, 149, 155; 296/187.03, 187.09; 188/371, 377

(56) References Cited

U.S. PATENT DOCUMENTS 3,926,463 A * 12/1975 Landwehr et al. .......... 293/136
3,933,387 A * 1/1976 Salloum et al. ............. 293/120
4,029,350 A * 6/1977 Goupy et al. ............... 293/110
4,275,912 A * 6/1981 Bayer ......................... 293/120
5,425,561 A * 6/1995 Morgan ...................... 293/120
5,746,419 A * 5/1998 McFadden et al. ......... 267/140
6,085,878 A * 7/2000 Araki et al. ................. 188/377
6,406,081 B1 * 6/2002 Mahfet et al. .............. 293/133
6,467,821 B2 * 10/2002 Hirota ......................... 293/120
6,540,275 B1 * 4/2003 Iwamoto et al. ............ 293/24
6,547,294 B2 * 4/2003 Yamamoto .................. 293/105
6,637,786 B2 * 10/2003 Yamagiwa ................... 293/102

FOREIGN PATENT DOCUMENTS

JP    8-164810 A    6/1996
JP    2978083 A    9/1999

* cited by examiner

Primary Examiner—D. Glenn Dayoan
Assistant Examiner—Greg Blankenship
(74) Attorney, Agent, or Firm—Birch, Stewart, Kolasch & Birch, LLP

(57) ABSTRACT

To provide a shock absorber that can effectively absorb a large amount of energy generated in case of a collision. A lattice body of synthetic resin is formed by reducing the thickness of a plurality of plate ribs gradually from the proximal ends to the distal ends and disposing the plate ribs intersecting with each other. The lattice bodies are arranged in a stack such that the direction of the plate ribs extending from the proximal ends toward the distal ends is oriented in an impact direction.

17 Claims, 8 Drawing Sheets

SHOCK ABSORBER FOR A TWO-WHEELED VEHICLE

CROSS-REFERENCE TO RELATED APPLICATIONS

This nonprovisional application is a Continuation of U.S. application Ser. No. 10/207,987, filed Jul. 31, 2002, now U.S. Pat. No. 6,637,786, the entirety of which is hereby incorporated by reference, and for which priority is claimed under 35 U.S.C. § 120. This application also claims priority under 35 U.S.C. § 119(a) on Patent Application No. 2001-239973 filed in Japan on Aug. 7, 2001, the entirety of which is hereby incorporated by reference.

BACKGROUND OF THE INVENTION

1. Field of the Invention

The present invention relates to a shock absorber for a two-wheeled vehicle. In particular, the present invention relates to a shock absorber for a two-wheeled vehicle for effectively protecting an occupant against a frontal crash of the two-wheeled vehicle.

2. Description of Background Art

A shock absorber is used in an automotive vehicle for protecting occupants in case of a collision. For example, shock absorbers are provided inside of pillar garnishes for protecting the heads of the occupants and inside of the door trims for protecting the backs or the chests of the occupants and the like in case of a side collision. Resin ribs that can be manufactured at relatively low cost have been in heavy usage as shock absorbers (See JP-A-8-164810, JP Patent No. 2978083, etc.).

However, with regard to two-wheeled vehicles, the absorption of energy in case of a collision has not been examined so far.

A shock absorber for a two-wheeled vehicle is required to absorb a much larger amount of energy in comparison with that for an automotive vehicle. For example, in the case of an automotive vehicle, kinetic energy to be absorbed $Ek=\frac{1}{2}mv^2$ is 102.1 [J], which is determined based on the energy generated when a dummy head of 4.54 kg in mass clashes at a speed of 15 mile/h (=6.71 m/s). In the case of a two-wheeled vehicle, kinetic energy to be absorbed Ek is 9646 [J], where the vehicle mass is 100 kg, and the traveling velocity is 50 km/h (=13.89 m/s). Accordingly, an incommensurably large energy absorption must be realized.

Assuming that a resin rib for an automotive vehicle is used, the height of the rib is in the order of 60 mm at most. Accordingly, a considerably large area is required on the two-wheeled vehicle when the resin rib, having the same absorption stroke, is applied thereto, which is actually impossible. The shock absorber is to be mounted at the front end of the two-wheeled vehicle. Accordingly, it is impossible to enlarge the front area thereof. On the other hand, assuming that a method of increasing the height of the resin rib is employed, the rib may be ever-increasingly thicker because it is necessary to provide a draft angle for manufacturing reasons. This results in a disadvantage in that a generated load increases.

SUMMARY OF THE INVENTION

In order to solve the aforementioned problems, it is an object of the present invention to provide a shock absorber for a two-wheeled vehicle that effectively absorbs a large energy generated in case of a collision and that may be easily mounted on a two-wheeled vehicle.

In order to achieve the aforementioned object, according to a first aspect of the present invention, a shock absorber for a two-wheeled vehicle includes shock absorbing members of synthetic resin. Each of the shock absorbing members comprise a lattice body including a plurality of plate ribs reduced in thickness from the proximal ends toward the distal ends and being disposed intersecting with each other. The lattice bodies are arranged in a stack in such a manner that the direction of the plate ribs extending from the proximal ends toward the distal ends is oriented along the fore-and-aft direction of the two-wheeled vehicle. The lattice bodies are mounted at the front end of the two-wheeled vehicle.

According to a second aspect of the present invention, a shock absorber for a two-wheeled vehicle includes shock absorbing members of synthetic resin. Each of the shock absorbing members comprises a lattice body including a plurality of plate ribs reduced in thickness from the proximal ends toward the distal ends and disposed intersecting with each other. A tabular basal plate is provided for shielding each lattice space of the lattice body molded integrally with each other. The lattice bodies are arranged in a stack in such a manner that the direction of the plate ribs extending from the proximal ends toward the distal ends is oriented along the fore-and-aft direction of the two-wheeled vehicle. The lattice bodies are mounted at the front end of the two-wheeled vehicle.

The shock absorber for a two-wheeled vehicle according to a third aspect of the present invention includes the lattice opening at the center of the lattice body being made larger than the lattice openings formed on the portion other than the center.

The shock absorber for a two-wheeled vehicle according to a fourth aspect of the present invention includes a part of the plate ribs positioned in the central area of the lattice body being thinned out when forming the lattice body by disposing a plurality of plate ribs intersecting with each other.

According to the first aspect of the present invention, the lattice bodies are arranged in a stack in such a manner that the direction of the plate ribs extending from the proximal end toward the distal end is oriented along the fore-and-aft direction of the two-wheeled vehicle. The lattice bodies are mounted at the front end of the two-wheeled vehicle. Arranging the lattice bodies in a stack (stacking lattice bodies) contributes to secure a large shock absorbing stroke for a frontal collision of the two-wheel vehicle, thereby a large impact to be absorbed as desired. In addition, since the shock absorbing members are arranged in a stack, the height of the plate rib in the lattice body, which constitutes each tier, may be reduced to the value in the order of 60 mm, so that the proximal end of the rib is prevented from being too thick even when a draft angle is provided, and thus such disadvantage that the generated load increases may not arise.

According to the second aspect of the present invention, the shock absorbing members including the lattice body and the basal plate molded integrally with each other are arranged in a stack. In the case where each of the shock absorbing members arranged in a stack is subjected to an impact load, the basal plate receives the impact load as a whole in a first place. The impact load is then transmitted to each plate rib, and the plate ribs are crushed continuously to absorb the impact load effectively.

According to the third and fourth aspects of the present invention, the lattice opening at the center of the lattice body is made larger than the lattice openings formed on the portion other than the center. Alternatively, a part of the plate ribs positioned in the central area of the lattice body is thinned out in forming a lattice body by disposing a plurality of plate ribs intersecting with each other. The strength of the shock absorber formed by arranging the shock absorbing members in a stack is low at the portion near the central axis in comparison with the cases in which all the openings are the same in size as a whole, and in which thinning-out is not made, and thus it crushes stably when being subjected to an impact load.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
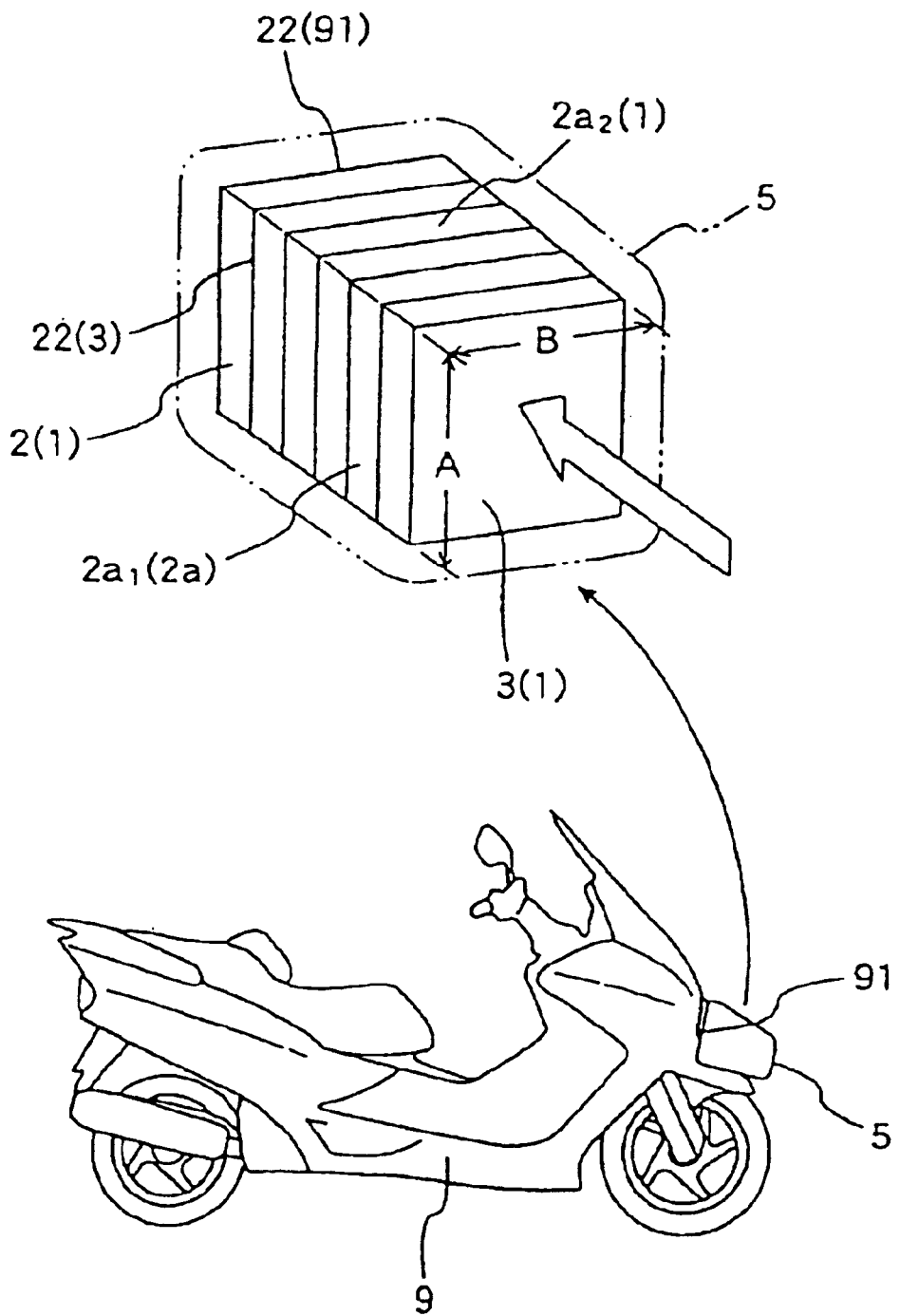
FIG. 1 is an explanatory perspective view illustrating a shock absorber mounted on a two-wheeled vehicle according to one embodiment of the shock absorber of the present invention.
Figure 2:
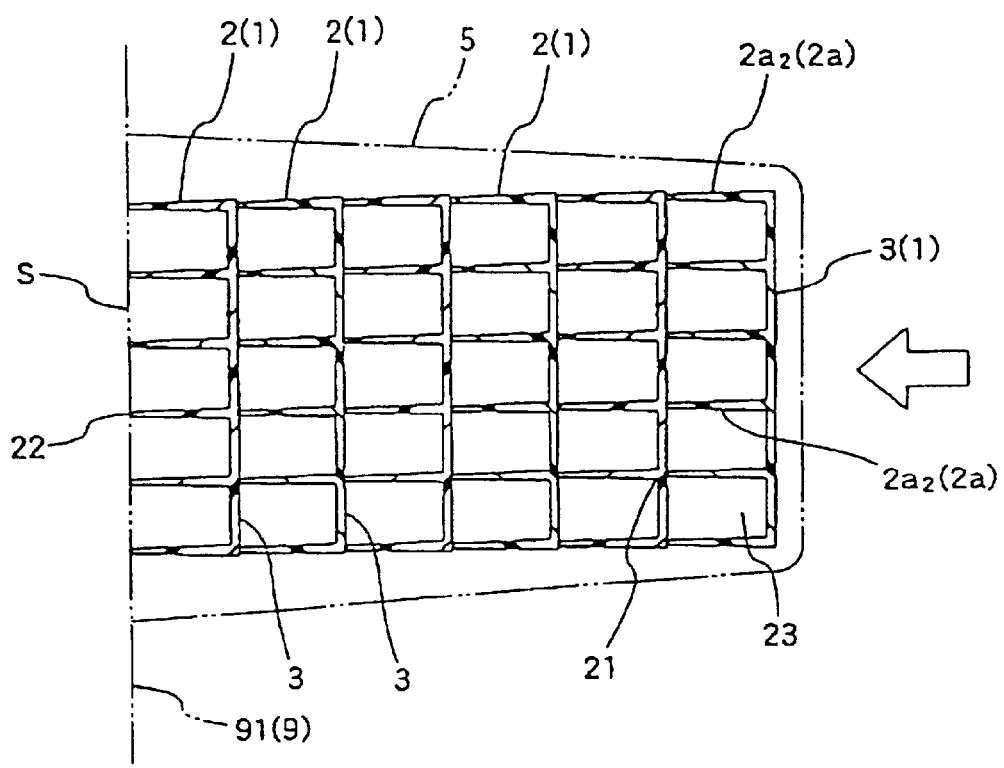
FIG. 2 is a vertical cross sectional view of the shock absorber.
Figure 3:
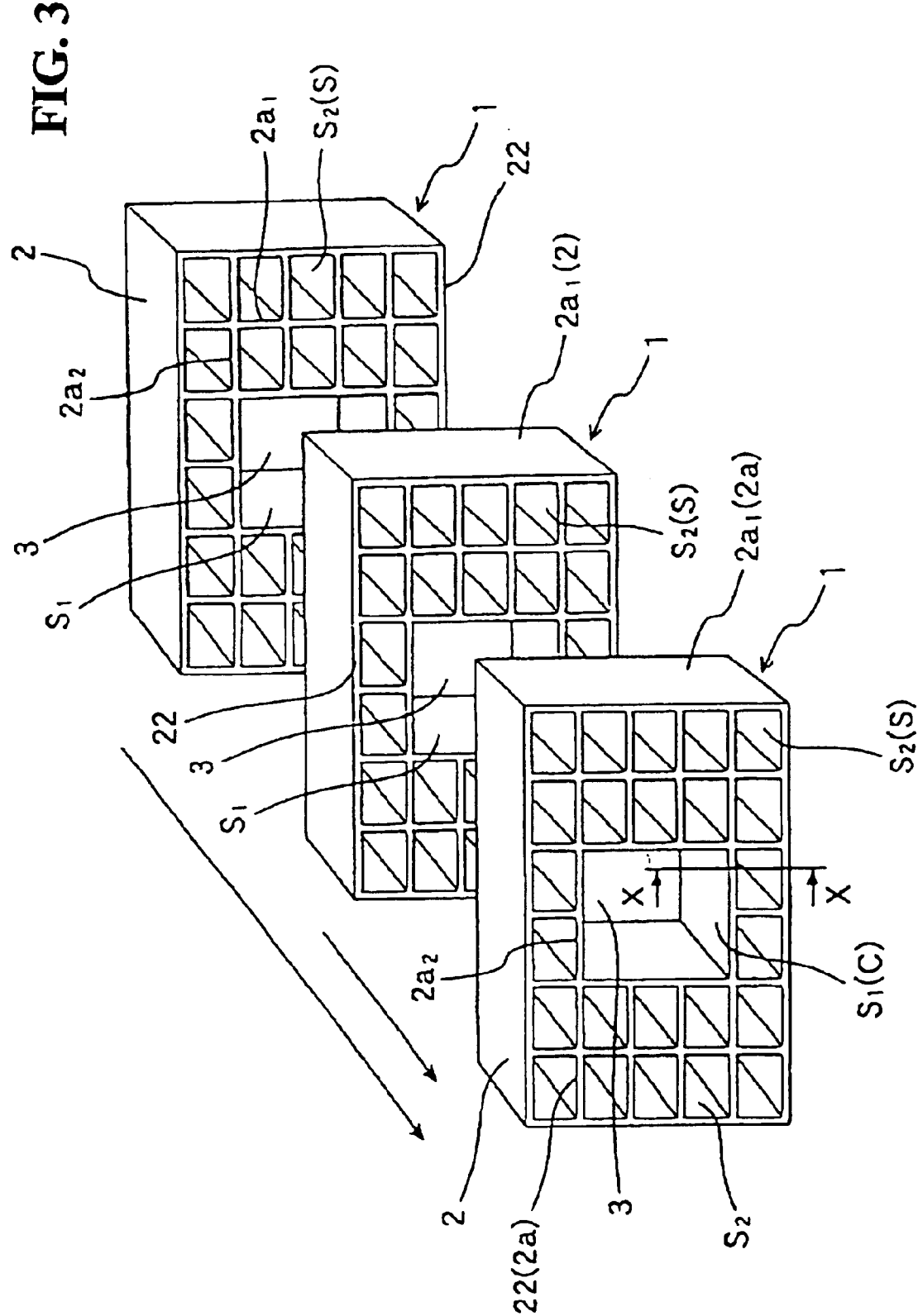
FIG. 3 is an exploded perspective view of the shock absorber.
Figure 4:
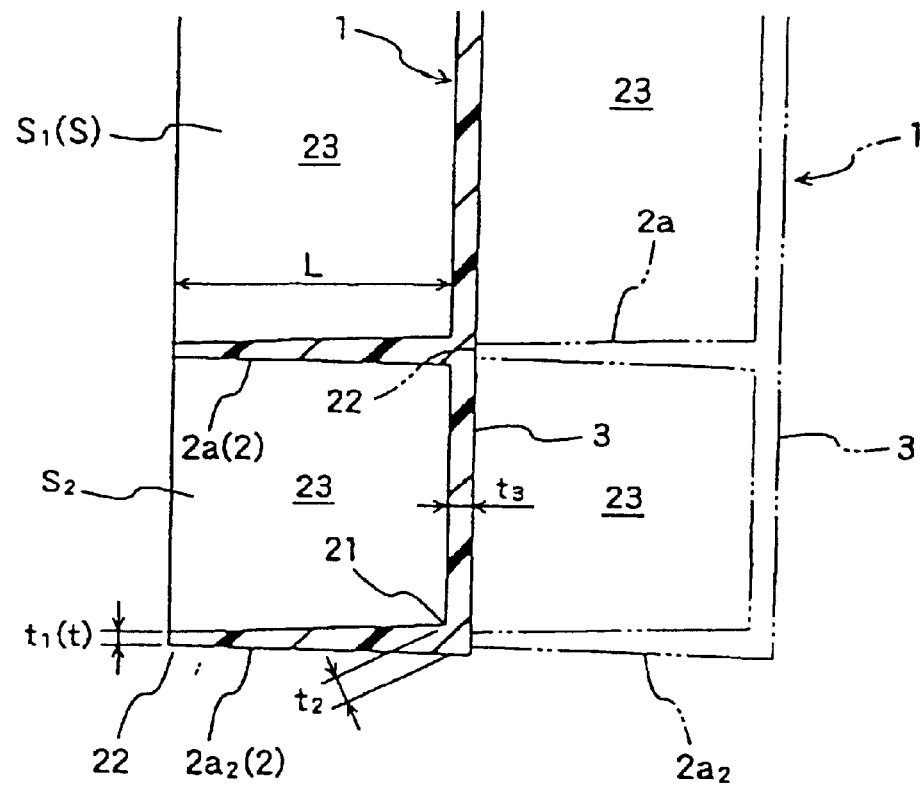
FIG. 4 is a drawing viewed in the direction shown by the arrow X—X in FIG. 3.
Figure 5A:
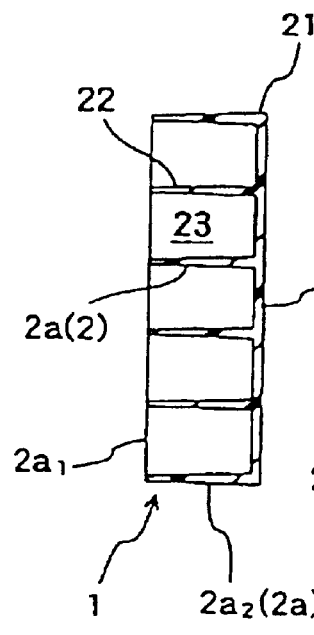
FIG. 5 is a vertical cross sectional view of the shock absorbing member.
Figure 5B:
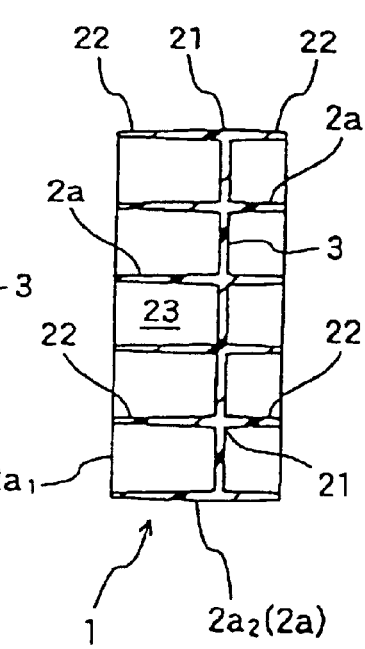
Figure 5C:
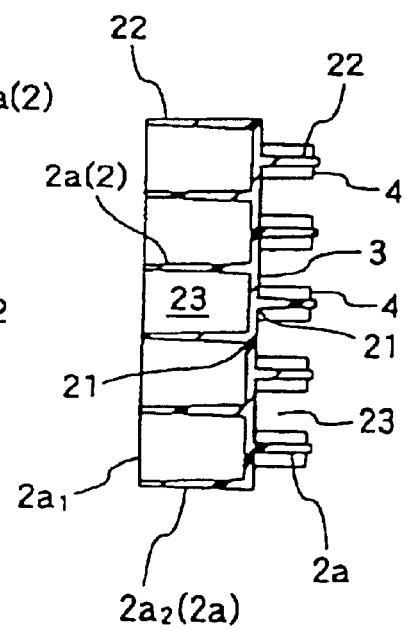
Figure 6A:
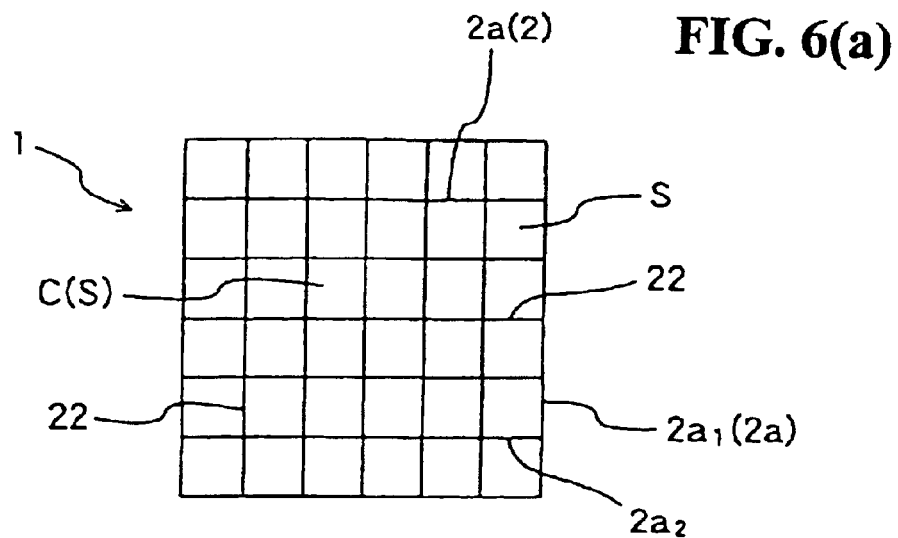
FIG. 6 is a plan view of the shock absorbing member.
Figure 6B:
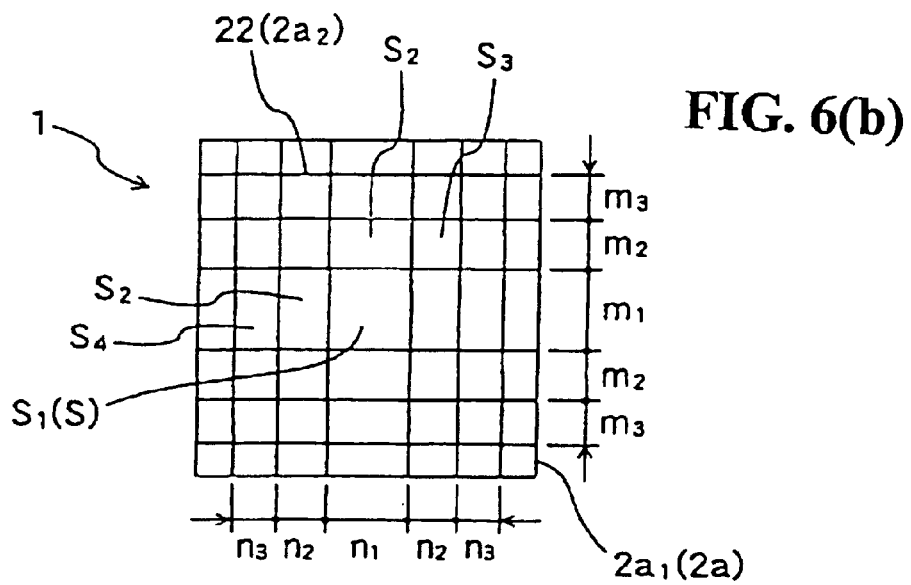
Figure 6C:
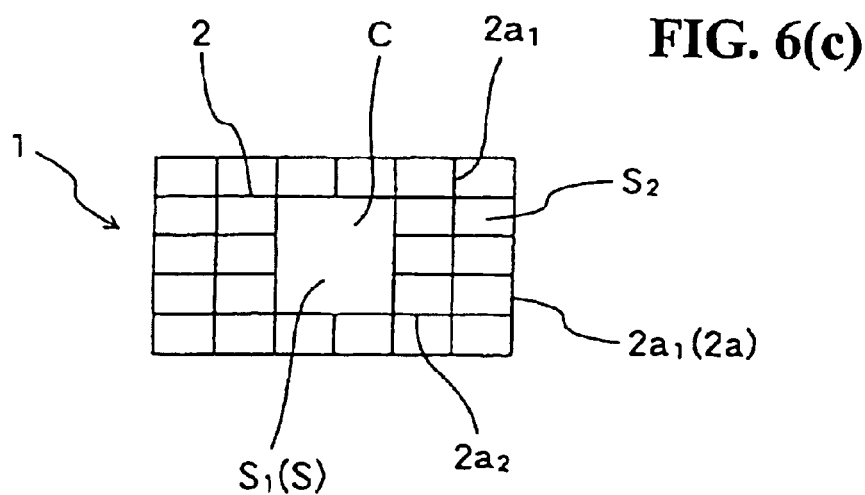
Figure 7A:
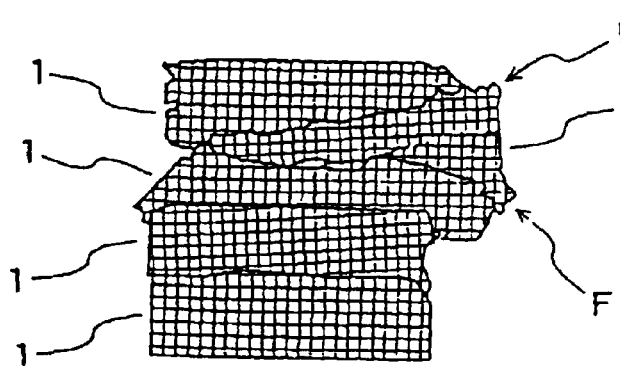
FIG. 7 is an explanatory drawing showing the progress of the shock absorption.
Figure 7B:
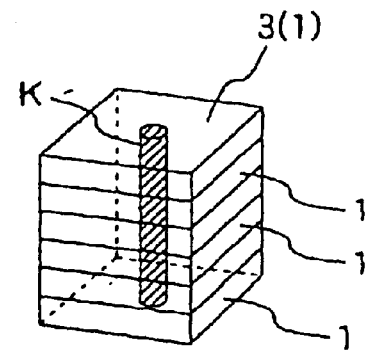
Figure 8A:
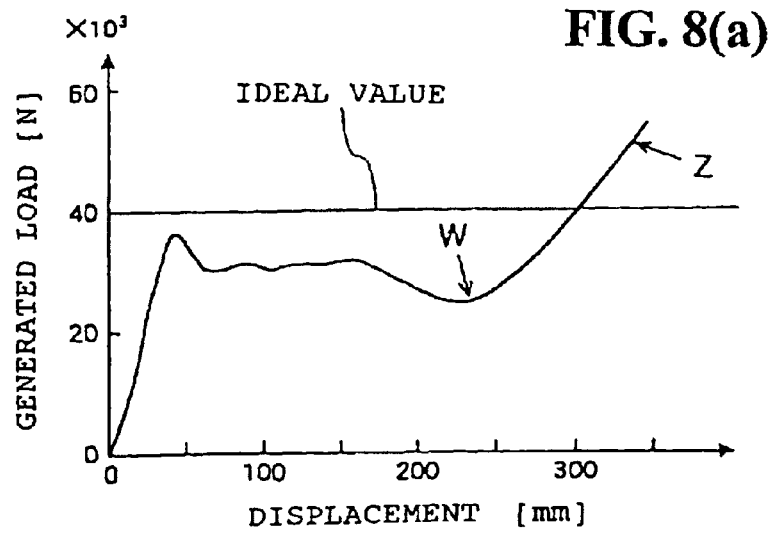
FIG. 8 is a graph of the generated load with respect to the displacement.
Figure 8B:
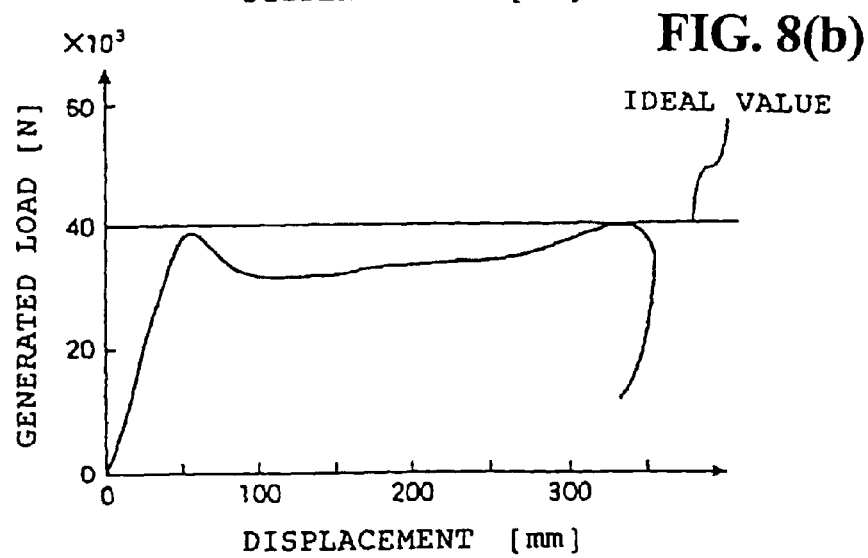
Figure 9:
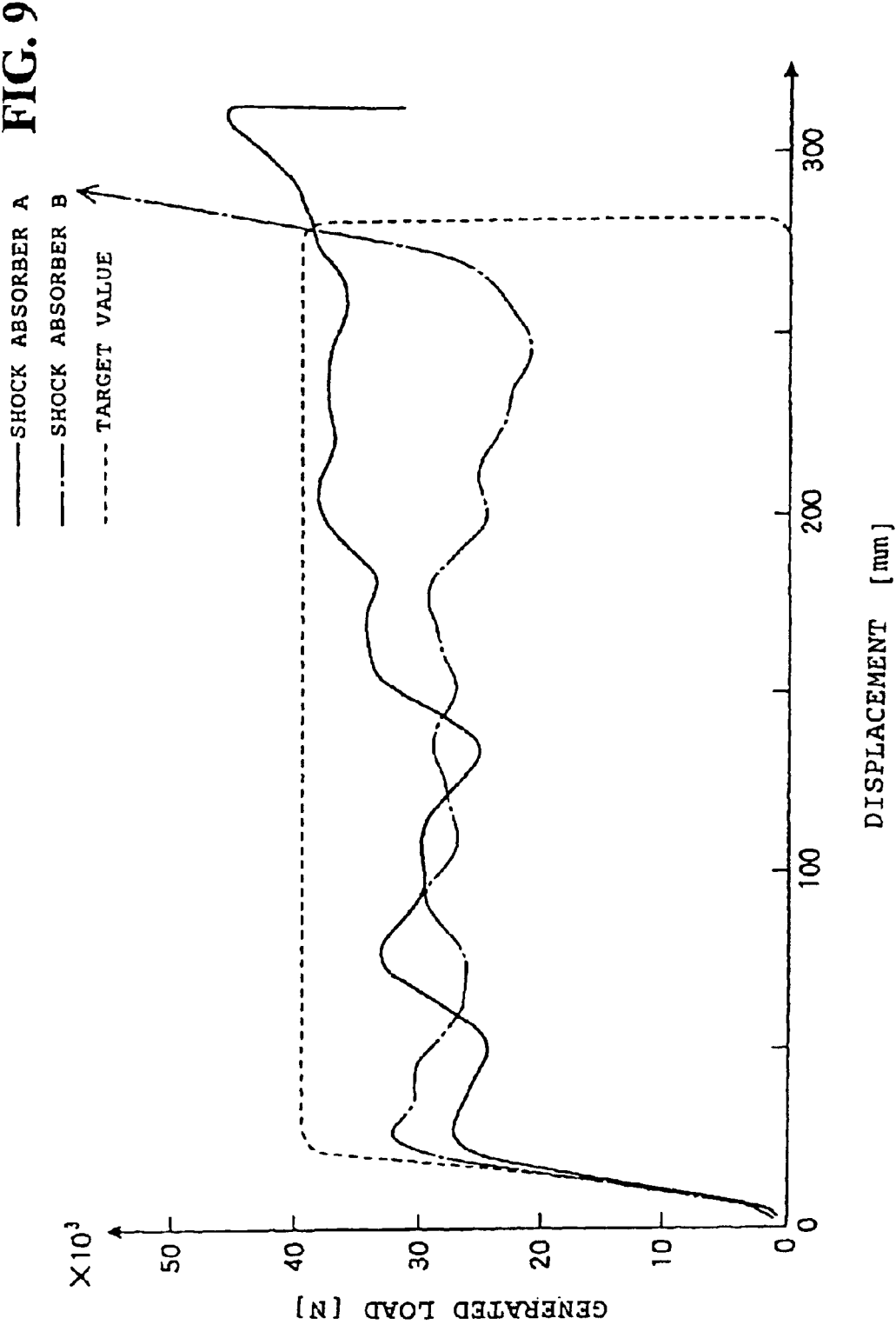
FIG. 9 is a graph of the generated load with respect to the time instants.

A shock absorber for a two-wheeled vehicle of the present invention (hereinafter, referred to simply as "shock absorber") will now be described in detail with reference to the accompanying drawings. FIGS. 1 to 9 show one embodiment of the shock absorber according to the present invention. FIG. 1 is an explanatory perspective view illustrating a shock absorber mounted on a two-wheeled vehicle. FIG. 2 is a vertical cross sectional view of the shock absorber shown in FIG. 1. FIG. 3 is an exploded perspective view of the shock absorber. FIG. 4 is a drawing viewed in the direction represented by the arrow X—X in FIG. 3. FIG. 5 is a vertical cross sectional view of the shock absorbing member. FIG. 6 is a plan view of the shock absorbing member. FIG. 7 is an explanatory drawing showing the progress of the shock absorption. FIG. 8 is a graph of generated loads with respect to displacements. FIG. 9 is a graph of generated loads with respect to the time instants. In FIGS. 1 and 2, the hollow arrows represent the direction of the impact load generated in case of frontal collision.

The shock absorber includes shock absorbing members 1 each including a lattice body 2 of synthetic resin. Each of the lattice bodies are formed by reducing the thickness of the plate ribs 2a gradually from the proximal ends 21 to the distal ends 22 and disposed intersecting with each other. The lattice bodies 2 are arranged in a stack in such a manner that the direction of the plate ribs 2a extending from the proximal ends 21 toward the distal ends 22 is oriented along the fore-and-aft direction of a two-wheeled vehicle 9. The shock absorber in FIG. 1 includes the shock absorbing members 1 stacked in six-tier construction. The exploded perspective view in FIG. 3 shows only three shock absorbing members 1 of the three shock absorbing members.

The lattice body 2 is formed of synthetic resin and is formed by disposing plate ribs 2a composed of plate portions intersecting with each other so as to form a lattice in the direction of frontal collision. The lattice body 2 is formed so as to be capable of being buckled or deformed easily by an external force exerted in case of a collision. Accordingly, the lattice body exercises shock absorbing capability for absorbing the impact of the collision. More specifically, each plate rib 2a constructing the lattice body 2 has a tapered configuration having a smaller thickness $t_1$ at the distal end 22 in comparison with a thickness $t_2$ at the proximal end 21 (FIG. 4). Accordingly, the thickness t of the lattice body 2 decreases gradually toward the distal end 22. When an impact load is exerted, buckling and deformation proceed gradually from the distal end portion 22 of the lattice body 2 that is low in strength so that the impact pressure is effectively absorbed. In addition, by arranging the lattice bodies 2 in a stack (stacking the lattice bodies 2), the impact load can be absorbed more effectively. Although vertical ribs $2a_1$ and lateral ribs $2a_2$ of the plate ribs 2a forming a lattice are plates having the same configuration in this embodiment, the thickness and the like of the vertical ribs $2a_1$ and the lateral ribs $2a_2$ can be selected separately as needed.

With effective shock absorption taken into consideration, the plate rib 2a forming the lattice body 2 preferably has a height in the range between 30 mm to 60 mm, a thickness $t_1$ of the distal end 22 in the range between 0.5 mm to 1.0 mm, and a thickness $t_2$ of the proximal end 21 in the range between 1.0 mm to 2.5 mm. The dimensions of the lattice body 2 itself are such that the vertical dimension A is in the order of 140 mm, the lateral dimension B is in the order of 200 mm, the height is 30 mm to 60 mm as described above, and the pitches of the plate ribs 2a forming the lattice spaces 23 are in the order of 20 mm to 30 mm. The shock absorbers 1 are then horizontally stacked into a several-tier construction (six tier in this embodiment), and mounted at the front end of the two-wheeled vehicle 9. The shock absorbers are covered by a cover 5 as shown in FIG. 1.

Although the shock absorber in the present invention simply comprises a lattice body 2, it is further preferable to use the shock absorbing member 1 formed of synthetic resin including the lattice body 2 and a basal plate 3 for shielding the lattice space 23 molded integrally with respect to each other. The shock absorbing members each including the lattice body 2 and the basal plate 3 molded integrally with respect to each other are arranged in a stack. More specifically, the shock absorbing members are arranged horizontally into a several-tier construction so that the distal ends 22 of the plate ribs 2a abut against the basal plate 3 of the shock absorbing member 1 to be disposed adjacent thereof. When an impact load is exerted on the shock absorber including the shock absorbing members 1, arranged in a stack, the basal plate 3 receives the impact load as a whole in a first place. The impact load is then transmitted to each plate rib 2a to cause buckling and deformation, so that the impact load can be sufficiently absorbed.

The resin material employed for forming the shock absorbing members 1 is preferably a thermoplastic resin such as PP, PPF, ABS, PC/ABS (alloy of polycarbonate and ABS), and the like.

The basal plate 3 is a tabular body for shielding the lattice space 23 by being in contact with the lattice body 2. The basal plate 3 in this case is, as shown in FIGS. 2 and 3, a top board that comes into contact with the lattice body 2 on the proximal sides 21 of the lattice ribs. The basal plate 3 and the lattice body 2 are integrally molded and provided in such a manner that the basal plate 3 covers the lattice opening surface on the proximal side 21 formed by the lattice ribs 2a. The tabular basal plate 3 is a single unit including the basal plate 3 and the lattice body 2 including plate ribs 2a being reduced in thickness t from the proximal ends 21 toward the distal ends 22 and provided on the basal plate 3 so as to stand upright thereon in the form of a lattice. The basal plate 3 is mounted at the front end 91 of the two-wheeled vehicle oriented in such a manner that the basal plate 3 faces toward the direction of frontal collision. A lattice opening S of each shock absorbing member 1 faces toward the rear of the vehicle (FIG. 2). When the shock absorber is subjected to an impact load, the basal plate 3 receives the load as a whole in a first place. The load can then be dispersed to the respective plate ribs 2a of the lattice body 2. The thickness of the basal plate 3 is required to be such that it has rigidity to some extent so as to be capable of receiving the impact on an entire area thereof. In this case, the basal plate 3 having a thickness of 2 mm is employed. It is also possible to enforce the basal plate 3 by providing a flange for securing the rigidity as needed.

Although the basal plate 3 is provided so as to cover the surface on the proximal side 21 of the lattice body 2 (FIG. 5(*a*)), the basal plate 3 must only be able to shield the lattice space 23. For example, as in FIGS. 5(*b*) and 5(*c*), the basal plate 3 can be provided in such a manner that the basal plate 3 traverses through the interior of the lattice body 2. FIG. 5(*b*) shows an example in which plate ribs 2a, 2a extend upright from both sides of the basal plate 3 and intersect with each other with the thickness thereof being decreased gradually from the proximal ends 21 toward the distal ends 22 to form the lattice bodies 2. In other words, a single unit of the basal plate 3 and lattice bodies 2, 2 is formed on both sides thereof. FIG. 5(*c*) shows an example in which a lattice body 2 including plate ribs 2a being reduced in thickness from the proximal ends 21 toward the distal end 22 is provided on one side of the basal plate 3 so as to stand upright. Bodies 4 in cross shape in side view include plate ribs 2a being reduced in thickness from the proximal ends 21 toward the distal ends 22. The bodies 4 are provided upright on the other side thereof. Both examples shown in FIGS. 5(*b*) and 5(*c*) are provided with draft angles on the lattice body 2. Cross-shaped bodies 4 extend from both sides of the basal plate 3. Accordingly, there is no problem in manufacturing. The cross-shaped bodies 4 are accommodated in the lattice space 23 of the lattice body 2 of the next tier when the shock absorbing members 1 are arranged in a stack to form a shock absorber. When an impact load is exerted thereon, the cross-shaped bodies 4 are buckled and deformed from the distal ends 22, which are low in mechanical strength. Accordingly, an impact can be absorbed with the cross-shaped bodies. The cross-shaped body 4 is effective when there is a limit in the overall height of the stacked shock absorbers.

Furthermore, in this embodiment, a shock absorbing member 1 is employed, in which the lattice opening S located at the center of he lattice body 2 is made larger than those located on the portion other than the center. The present invention provides a shock absorber in which the shock absorbing members 1 (lattice bodies 2) are arranged in a stack. The plate ribs 2a located on the outer side of the lattice body 2 can be deformed outwardly, but those located in the center area of the lattice body 2 are trapped. In other words, the lattice body 2 is hard in the center area and flexible in the outer area. When the lattice body 2 is crushed by being compressed evenly, no problem arises when crushing only one tier of the shock absorbing member 1. However, in the case of the shock absorbing member 1 stacked in a multiple-tier (arranged in a stack), the central portion positioned in the mid tier remains. When any one of the outer plate ribs 2a is crushed first, the lattice body 2 tends to incline toward the crushed plate rib, and the inclined lattice body 2 is pushed outwardly of the stacked portion by the front and rear plate ribs 2a. The plate rib F that was sprung outward cannot be crushed, which results in no energy being absorbed by the plate rib F (FIG. 7(*a*)). As a matter of course, misalignment of the shock absorbing members 1 arranged in a stack is prevented by means of a locking mechanism, adhesion, heat welding, or the like. However, the plate rib F still tends to be sprung outwardly. Therefore, it is constructed so as to be crushed stably by intentionally weakening the center K of the lattice body 2 (FIG. 7(*b*)), or by making the lattice opening S at the center of the lattice body 2 larger than those located on the portion other than the center.

More specifically, the lattice is constructed as a plan view of the lattice body 2 shown in FIGS. 6(*b*) and 6(*c*) when viewed from the distal end side 22. FIG. 6 is a schematic plan view showing the state of opening of the distal end area 22 of the lattice body 2. The lattice opening $S_1$ at the center of the lattice body 2 is made larger than the lattice openings $S_2$, $S_3$ located on the portion other than the center by increasing the pitches of the vertical ribs $2a_1$, as shown by . . . , $n_3$, $n_2$, $n_1$, and increasing the pitches of the lateral ribs $2a_2$ as shown by . . . , $m_3$, $m_2$, $m_1$ toward the center of the lattice body 2 as shown in FIG. 6(*b*). However, the lattice body 2 may be such that the plate ribs 2a are disposed at regular pitches as shown in FIG. 6(*a*). Alternatively, as shown in FIG. 6(*c*), the lattice body 2 has a part of the plate ribs 2a positioned in the central area C thinned out when forming the lattice body 2 by disposing a plurality of plate ribs 2a intersecting with each other. As a consequence, the lattice opening S1 at the central portion becomes larger than those formed on the portions other than the center.

With the lattice openings S located at regular intervals as shown in FIG. 6(*a*), the lattice body 2 is in a state as if a core K (hard portion) exists at the central axis (FIG. 7(*b*)). Thus, the lattice body 2 inclines toward the flexible portion as it is being crushed (FIG. 7(*a*)), thereby becoming unstable. As a consequence, the lattice body 2 crushed aslant may be dropped out and the plate rib F is likely to be sprung out. In contrast to this, when a part of the plate ribs 2a positioned in the central area C is thinned out, or when the lattice opening S at the center of the lattice body 2 is made larger than those formed on the portion other than the center, the state is such that the aforementioned core is removed.

Accordingly, the lattice bodies 2 can be crushed stably. The present embodiment includes the lattice body 2 shown in FIG. 6(c), which employs the shock absorbing member 1 provided with the basal plate 3, and which is of six-tier construction (FIGS. 1 through 4). The result of a comparative representative test is shown in FIG. 8. FIG. 8(b) shows the case in which a part of one vertical rib 2a, and a part of two lateral ribs $2a_2$ are thinned out in the central area C as in the present embodiment. FIG. 8(a) shows the case in which they are not thinned out. Without thinning out, the generated load is lowered due to a drop-off of the rib in the state where it was crushed to some extent (point W) as shown in FIG. 8(a). In addition, the generated load increases in the latter half (point Z) by the amount corresponding to the energy that was not absorbed due to drop-off of the plate ribs 2a. In contrast to this, in the shock absorber formed by stacking the shock absorbing member 1, the generated load with respect to the displacement is stable as shown in FIG. 8(b), and thus the impact of collision is well absorbed. Although it is not shown in the figure, it was recognized that the generated load is also stable as in the graph of FIG. 8(b) when the shock absorber is employed, which is formed by stacking the shock absorbing members 1 having the lattice opening $S_1$ at the center of the lattice body 2 made larger than those formed on the portion other than the center as shown in FIG. 6(b).

A graph representing the relation between the generated load and displacement of the shock absorber according to the present embodiment is shown in FIG. 9. The shock absorber A shown in a solid line in FIG. 9 is an article of the present embodiment that is thinned out. The shock absorber B shown by a chained line is formed with lattice openings S at regular intervals without thinning out. The broken line represents an ideal curve value. The shock absorber B is capable of absorbing an impact to a significant extent in comparison with that in the background art. However, the shock absorber B is sagged significantly in the vertical direction or in the lateral direction, and a block of the plate rib 2a at the central portion is dropped out, whereby the generated load is lowered once and then increases to a high value due to the occurrence of final contact without absorbing energy completely. In contrast to this, the shock absorber A can be compressed straightway without sagging in the vertical and lateral directions, and absorbs energy completely along substantially ideal curve.

Approximation of absorbed energy E from FIG. 9 is as follows. When the generated load is assumed to be F[N], and displacement is assumed to be S[m], since $40 \times 10^3$[N] is continuously outputted to the extent of 240[mm], the equation $E = F \times S = 40 \times 10^3[N] \times 0.24[m] = 9600[J]$ is established in the ideal curve. This represents that the absorbed energy is almost equal to the absorbed energy Ek required for the two-wheeled vehicle 9 described in the aforementioned paragraph of the description of the background art and thus effective countermeasures are taken.

In the shock absorber constructed as described above, the shock absorbing members 1 having lattice bodies 2 are arranged in a stack in such a manner that the direction of the plate ribs 2a extending from the proximal ends 21 toward the distal ends 22 are oriented along the fore-and-aft direction of the two-wheeled vehicle 9, and the plate ribs 2a are reduced in thickness gradually from the proximal ends 21 toward the distal ends 22 thereof. Accordingly, the shock absorber can absorb an impact effectively. With such shock absorber mounted at the front end of the two-wheeled vehicle 9, it shows its ability satisfactorily on frontal collision of the two-wheeled vehicle 9.

Although the front area cannot be made larger for the two-wheeled vehicle 9, a new foothold was investigated by securing a space in the order of 360 mm in the fore-and-aft direction of the vehicle. Consequently, the problem in that the proximal portion 21 of the plate rib 2a becomes too thick due to a draft angle that must be formed thereon in case of the lattice body 2 in a single-tier construction is solved by stacking the lattice bodies. By employing stacking of the lattice bodies 2 (shock absorbing members 1), a long stroke may be secured, and thus energy may be absorbed to the last moment without increasing the thickness of the plate ribs 2a.

Furthermore, when the shock absorbing member 1 provided with the basal plate 3 on the lattice body 2 is employed, the basal plate 3 receives the load as a whole in a first place and then the load can be dispersed to the respective plate ribs 2a of the lattice body 2 for allowing the plate ribs 2a to be buckled and deformed when they receives the impact load in a stack. Accordingly, the impact load can be absorbed further effectively. In order that the basal plate 3 receives the impact load in a first place, it is preferable to dispose the basal plate 3 of the shock absorbing member 1 so as to face toward the direction of frontal collision.

In addition, by thinning out a portion of the plate ribs 2a positioned in the central area C of the lattice body 2 (or making the openings of the lattice positioned in the central part of the lattice body 2) larger than those formed on the portion other than the center, energy can be absorbed to the last moment with a stable generated load even when the shock absorbing members 1 are arranged in a stack so that energy is absorbed in a long stroke. Even when the lattice bodies 2 arranged in a stack (stacked rib blocks) are crushed, the plate ribs 2a do not drop out, and all the ribs may absorb impact energy effectively. Therefore, it is quite effective for frontal collision of the two-wheeled vehicle 9 that requires incommensurably large energy absorption in comparison with automotive vehicles.

The present invention is not limited to the above described embodiments, and various modification may be made within the scope of the present invention according to the object and usage thereof. Configurations, dimensions, number, material and the like of the shock absorbing member 1, the lattice body 2, the basal plate 3, and the like may be selected appropriately according to the usage.

Figure 10:
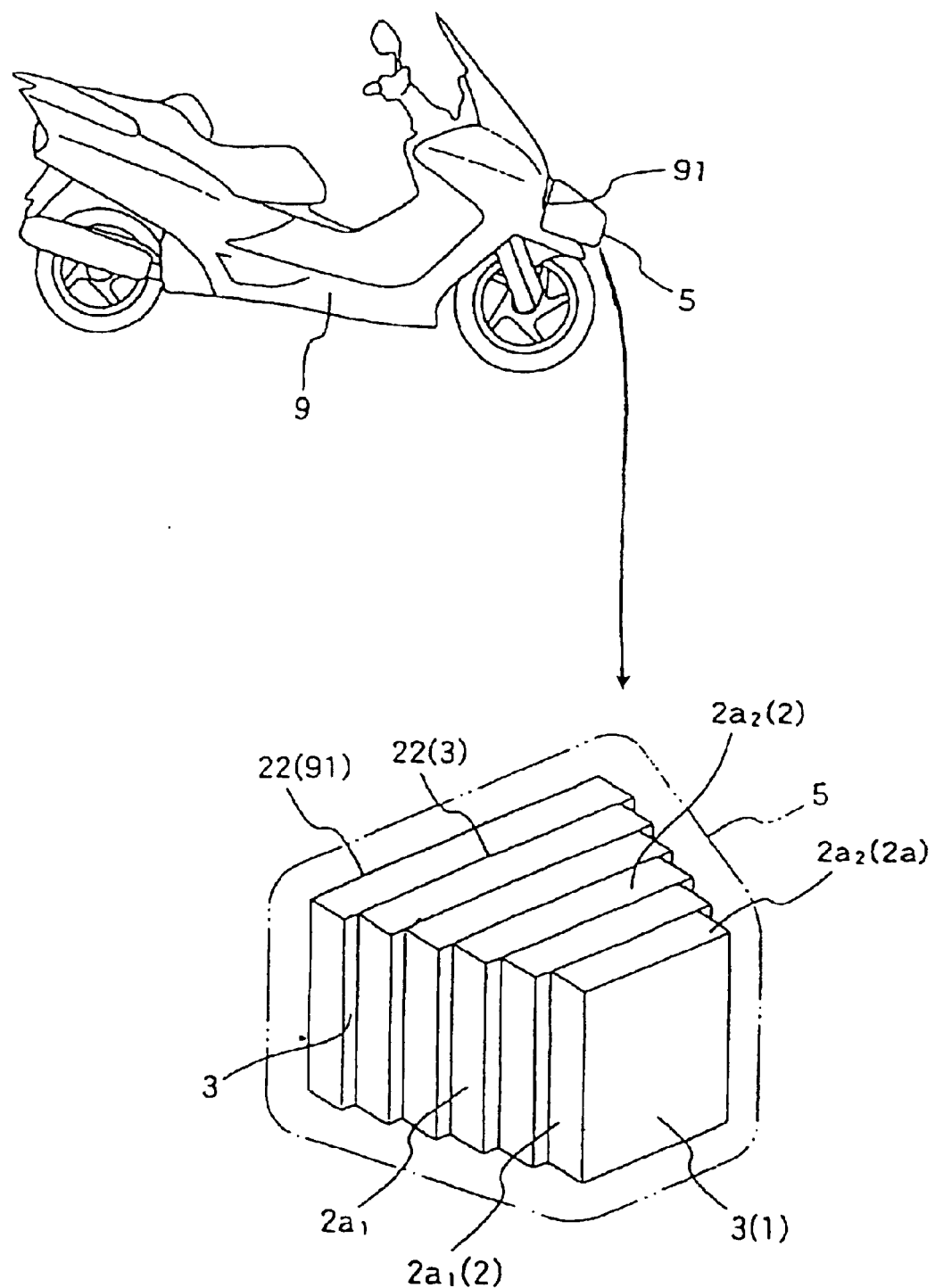
FIG. 10 is an explanatory perspective view of a shock absorber according to another embodiment mounted on the different type of the two-wheeled vehicle from the one shown in FIG. 1.

Although an example in which the shock absorber is mounted on the scooter-type two-wheeled vehicle 9 was shown in FIG. 1, it should be understood that it may also be applied to a delivery-type two-wheeled vehicle (not shown) and the like. In addition, the configuration of the shock absorbing member 1 may be formed in a pyramid shape as shown in FIG. 10. The number of tiers of shock absorbing members may be modified according to the usage.

As is described thus far, the shock absorber for a two-wheeled vehicle according to the present invention is capable of being mounted on the two-wheeled vehicle, and exercises superior effects such that it is capable of absorbing large energy effectively in case of a collision, which is required for a two-wheeled vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shock absorber, comprising:
   shock absorbing members of synthetic resin, each shock absorbing member including:

a lattice body, said lattice body including a plurality of plate ribs, each of said plate ribs being reduced in thickness from a proximal end toward a distal end thereof and being disposed intersecting with each other, wherein said shock absorbing members are arranged in a stack such that the direction of the plate ribs extending from the proximal end toward the distal end is oriented in an impact direction.

2. The shock absorber according to claim 1, wherein a lattice opening at a center of each of said lattice bodies is larger than lattice openings formed on a portion of said lattice bodies other than the center.

3. The shock absorber according to claim 1, wherein a portion of the plate ribs positioned in a central area of the lattice body is thinned out when forming the lattice body.

4. The shock absorber according to claim 1, wherein said plate ribs are oriented in a plurality of rows and a plurality of columns, said plurality of plate ribs oriented in rows intersecting with said plurality of plate ribs oriented in columns generally at a right angle.

5. The shock absorber according to claim 1, wherein said shock absorbing members are stacked horizontally with respect to each other with a distal end of one shock absorbing member abutting a proximal end of another, adjacent shock absorbing member.

6. The shock absorber according to claim 1, wherein said plate ribs form a plurality of lattice spaces in each of said lattice bodies, said lattice spaces being open at one end and closed at another, opposite end.

7. The shock absorber according to claim 6, wherein said closed ends of said lattice spaces are formed by a tabular basal plate, said tabular basal plate extending generally perpendicular to the impact direction.

8. The shock absorber according to claim 7, wherein said tabular basal plate includes a plurality of cross-shaped bodies extending in the impact direction therefrom, said plurality of cross-shaped bodies being located on a side of said tabular basal plate opposite to said plurality of plate ribs.

9. The shock absorber according to claim 8, wherein said plurality cross-shaped bodies on one lattice body are located within the lattice spaces of another, adjacent lattice body.

10. A shock absorber, comprising:

shock absorbing members of synthetic resin, each shock absorbing member including:

a lattice body, said lattice body including a plurality of plate ribs forming a plurality of lattice spaces, each of said plate ribs being reduced in thickness from a proximal end toward a distal end thereof and being disposed intersecting with each other; and a tabular basal plate, said tabular basal plate for shielding each of said lattice spaces of the lattice body, said tabular basal plate being molded integrally with said lattice body, wherein said shock absorbing members are arranged in a stack such that the direction of the plate ribs extending from the proximal ends toward the distal ends is oriented in an impact direction.

11. The shock absorber according to claim 10, wherein a lattice opening at a center of each of said lattice bodies is larger than lattice openings formed on a portion of said lattice bodies other than the center.

12. The shock absorber according to claim 10, wherein a portion of the plate ribs positioned in a central area of the lattice body is thinned out when forming the lattice body.

13. The shock absorber according to claim 10, wherein said plate ribs are oriented in a plurality of rows and a plurality of columns, said plurality of plate ribs oriented in rows intersecting with said plurality of plate ribs oriented in columns generally at a right angle.

14. The shock absorber according to claim 10, wherein said shock absorbing members are stacked horizontally with respect to each other with a distal end of one shock absorbing member abutting a proximal end of another, adjacent shock absorbing member.

15. The shock absorber according to claim 10, wherein said tabular basal plate extends generally perpendicular to the impact direction.

16. The shock absorber according to claim 15, wherein said tabular basal plate includes a plurality of cross-shaped bodies extending in the impact direction therefrom, said plurality of cross-shaped bodies being located on a side of said tabular basal plate opposite to said plurality of plate ribs.

17. The shock absorber according to claim 16, wherein said plurality cross-shaped bodies on one lattice body are located within the lattice spaces of another, adjacent lattice body.

* * * * *